(12) United States Patent
Harrington

(10) Patent No.: US 10,172,094 B2
(45) Date of Patent: Jan. 1, 2019

(54) BROADBAND MODEM AC POWER MONITOR FOR LOW POWER MODE

(71) Applicant: Hughes Network Systems, LLC, Germantown, MD (US)

(72) Inventor: Emanuel Harrington, Germantown, MD (US)

(73) Assignee: HUGHES NETWORK SYSTEMS, LLC, Germantown, MD (US)

( * ) Notice: Subject to any disclaimer, the term of this patent is extended or adjusted under 35 U.S.C. 154(b) by 112 days.

(21) Appl. No.: 14/840,614

(22) Filed: Aug. 31, 2015

(65) Prior Publication Data
US 2017/0064637 A1 Mar. 2, 2017

(51) Int. Cl.
*H04W 52/02* (2009.01)

(52) U.S. Cl.
CPC ......... *H04W 52/0296* (2013.01); *Y02B 60/50* (2013.01); *Y02D 70/00* (2018.01)

(58) Field of Classification Search
CPC ... H04W 52/0296; H04W 52/02; Y02B 60/50
See application file for complete search history.

(56) References Cited

U.S. PATENT DOCUMENTS

| | | | | |
|---|---|---|---|---|
| 4,951,309 A * | 8/1990 | Gross | ............ | G06F 1/3215 375/222 |
| 6,601,181 B1 * | 7/2003 | Thomas | ............ | G06F 1/30 713/340 |
| 6,628,207 B1 * | 9/2003 | Hemminger | ............ | H02J 9/061 324/110 |
| 2003/0105982 A1 * | 6/2003 | Suzuki | ............ | G06F 1/30 713/300 |
| 2007/0186251 A1 * | 8/2007 | Horowitz | ............ | H04L 41/0896 725/63 |
| 2007/0254609 A1 * | 11/2007 | Rosenthal | ............ | H02J 9/061 455/127.1 |
| 2008/0181393 A1 * | 7/2008 | Brost | ............ | H04L 12/66 379/413 |
| 2010/0254444 A1 * | 10/2010 | Clausen | ............ | H04L 5/0042 375/220 |
| 2013/0188526 A1 * | 7/2013 | Cooper, Jr. | ............ | H04M 1/2535 370/259 |
| 2013/0322251 A1 * | 12/2013 | Kotecha | ............ | H04W 28/24 370/236 |
| 2015/0223285 A1 * | 8/2015 | Ljung | ............ | H04W 52/0209 370/311 |

* cited by examiner

*Primary Examiner* — Charles C Jiang
*Assistant Examiner* — Kyaw Z Soe
(74) *Attorney, Agent, or Firm* — Nath, Goldberg & Meyer; Leonid D. Thenor

(57) ABSTRACT

An apparatus, system and method for monitoring power to a communication device and switching operation modes. The system is monitored in order to detect a power interruption to the communication device. A first signal is supplied to the communication device to indicate the occurrence of a power interruption and/or activation of a backup power supply. The communication device is then switched to a low power mode which limits one or more operating functions.

14 Claims, 5 Drawing Sheets

BROADBAND MODEM AC POWER MONITOR FOR LOW POWER MODE

BACKGROUND INFORMATION

Communication networks are increasingly used to supply new services to consumers. It is not uncommon to obtain voice, data, and video services over a single communication network from a single service provider, whereas the same services were previously provided by multiple service providers. Consumers rely on communication networks to obtain various types of content on devices such as mobile phones, tablets, computers, etc. Many consumers, for example, have also replaced legacy telephone service with newer network-based options such as Voice over Internet Protocol (VoIP).

As consumers continue to increase the amount of information carried over the communication network, the need for reliability and continuity of service also increases. For example, a common problem for consumers is loss of access to communication networks during a power outage, thereby leaving devices that provide access to communication networks, such as broadband modems, inoperable. Depending on the manner in which services are provided, consumers can be left without any vital communication and internet services (e.g., emergency voice calls). Consumers who rely on VoIP, for example, are unable to make telephone calls to authorities to report emergencies.

An Uninterruptable Power Supply (UPS) can sometimes be used to connect to various devices in order to prevent, for example, data loss during a power outage. Commonly available UPS devices, however, have a very short battery life for sustaining full functionality of the attached devices. This can sometimes be due to the number of non-essential functions and services being provided by devices connected to the UPS. For example, consumers utilize various services streaming music, videos, etc. over the communication network. Consumers also utilize various applications (e.g., social media, chat, etc.) to post and exchange content. Such services and applications, however, are not essential. Nonetheless, they can result in substantial power drains from a UPS, if used during a power outage.

It is not always feasible to increase the capacity and duration of a UPS because it is both cost and size prohibitive. Consumers also cannot be relied upon to manually discontinue the use of non-essential services during a power outage. This is due, at least in part, to the fact that many services and applications include components that continually transmit and receive data in the background without consumer knowledge. Thus, even if a consumer avoids the use of certain applications and services, the communication network may still be used to provide non-essential services during a power outage. Such services, however, can cause a significant reduction in the amount of time available for essential services while using the UPS. Based on the foregoing, there is a need for an approach which allows extended use of selected devices during a power outage.

BRIEF SUMMARY

A method, system, and apparatus are disclosed for monitoring power to a communication device and switching operation modes. According to one embodiment, the method includes: detecting a power interruption to at least one communication device; switching to a backup power supply to maintain continuous operation of the communication device; supplying a first signal to the communication device upon detection of the power interruption, the first signal being indicative of the power interruption and/or activation of the backup power supply; switching, the communication device, from a normal operation mode to a low power mode; and limiting one or more functions of the communication device while in the low power mode.

According to another embodiment, the system comprises: a communication device including one or more processors; a backup power supply for automatically supplying power to the communication device during a power interruption; and a power monitoring unit for detecting the power interruption. Upon detecting a power interruption, the power monitoring unit supplies a first signal to the communication device, the first signal being indicative of a power interruption and/or activation of the backup power supply. The one or more processors of the communication device are configured to: determine if a first signal, received by the communication device, is indicative of a power interruption and/or activation of the backup power supply; switch operation of the communication device from a normal operation mode to a low power mode; and limit one or more functions of the communication device while in the low power mode.

According to a further embodiment, the apparatus includes a communication device configured to receive at least one signal from an external source, the communication device including one or more processors configured to: determine if a first signal, received by the communication device, is indicative of a power interruption and/or activation of a backup power supply; switch operation of the communication device from a normal operation mode to a low power mode; and limit one or more functions of the communication device while in the low power mode.

The foregoing summary is only intended to provide a brief introduction to selected features that are described in greater detail below in the detailed description. As such, this summary is not intended to identify, represent, or highlight features believed to be key or essential to the claimed subject matter. Furthermore, this summary is not intended to be used as an aid in determining the scope of the claimed subject matter.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DETAILED DESCRIPTION

An apparatus, method, and system for monitoring power to a communication device and switching operation modes are described. In the following description, for purposes of explanation, numerous specific details are set forth in order to provide a thorough understanding of the disclosed embodiments. It will become apparent, however, to one skilled in the art that various embodiments may be practiced without these specific details or with an equivalent arrangement. In other instances, well-known structures and devices are shown in block diagram form in order to avoid unnecessarily obscuring the various embodiments.

Figure 1:
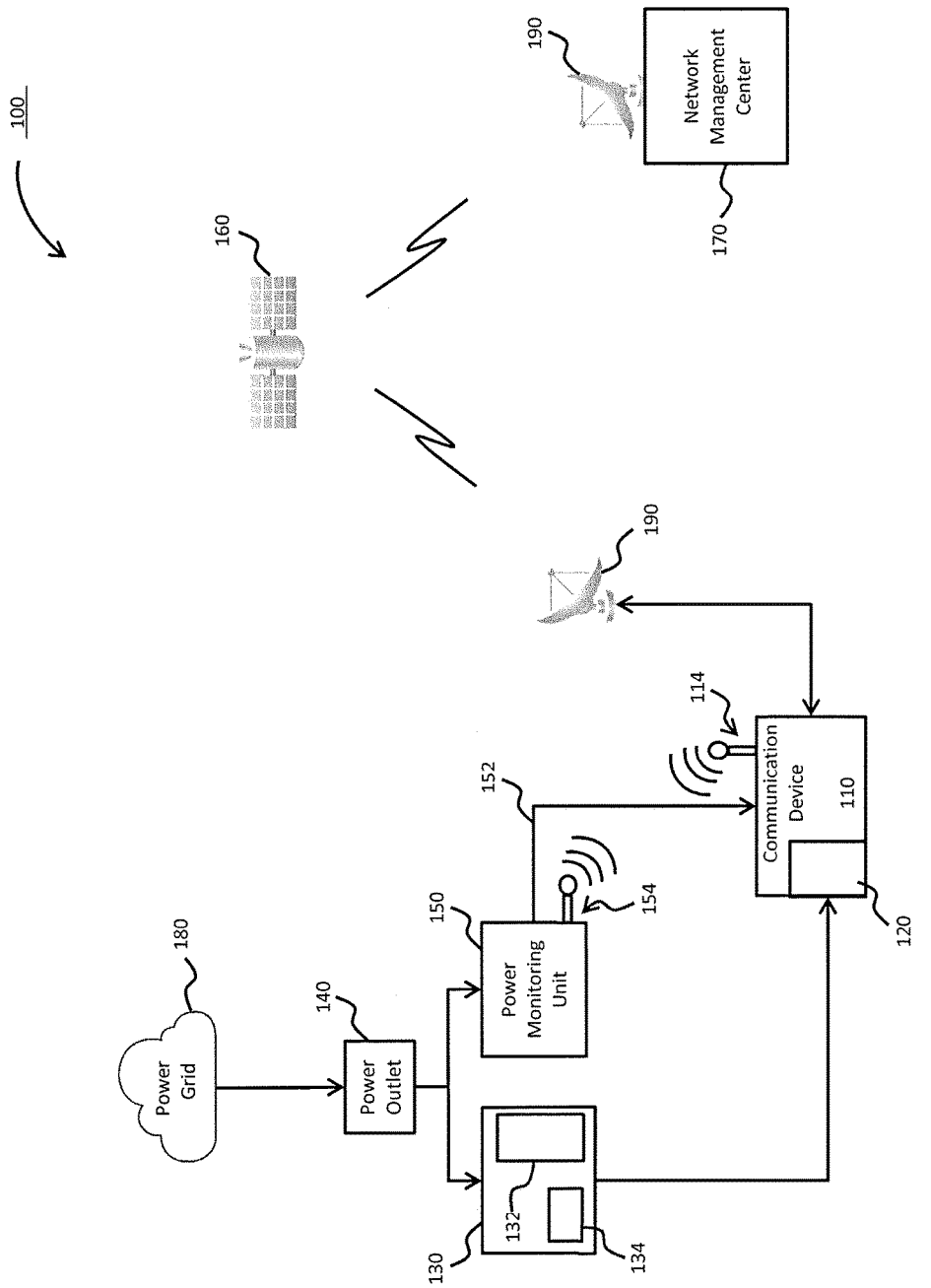
FIG. 1 is a diagram of a satellite communication system incorporating a power monitoring system, according to at least one embodiment.

FIG. 1 illustrates a satellite communication system 100 capable of incorporating a power monitoring system, in accordance with at least one embodiment. The satellite communication system 100 includes a satellite 160 that supports communication between one or more communication devices 110 and a network management center 170. Although not shown, the network management center 170 can include a gateway which facilitates communication between various public and private networks that are configured to transmit/receive voice, data, etc. Furthermore, the gateway can be connected to conventional voice networks and/or cellular networks.

According to various embodiments, communication with the satellite 160 is facilitated through ground-based transmitters, such as the illustrated RF transmitters 190 (or transmitter). According to at least one embodiment, the transmitters 190 can be in the form of very small aperture transmitters (VSAT) suitable for use by residential and/or business users. The satellite 160 operates in a bent pipe path between the communication devices 110 and the network management center 170. More particularly, information from the communication devices 110 to the network management center 170 (and vice versa) must first be transmitted to the satellite 160 and directed to the network management center 170 and/or destination communication terminal 110 by way of the respective transmitters 190. While only a single communication device 110 is illustrated in FIG. 1, it should be noted that communication can occur between multiple communication devices, as well as other customer equipment operating on public and/or private terrestrial networks (e.g., the Internet).

According to at least one embodiment, the communication device 110 may be a satellite modem, or other customer premise equipment, configured to operate and interface with the transmitter 190. According to other embodiments (discussed in greater detail below), the communication device 110 can be configured as a broadband modem, cable mode, digital subscriber line (DSL) modem, etc. The communication device 110 includes a power supply unit 120 which can be integrated within the communication device 110, or configured as a separate component that can be detachably connected to the communication device 110. The power supply unit 120 can be configured, for example, to include a transformer for converting conventional AC voltage to DC voltage.

According to the embodiment illustrated in FIG. 1, a backup power supply 130 is used to provide power to the communication device 110 via the power supply 120. The backup power supply 130 is further connected to a conventional power outlet 140 which receives power from a local/regional power grid 180. Alternatively, the power outlet 140 can receive power from alternative sources of energy such as solar cells, local generator, etc. According to one or more embodiments, power can be supplied to the communication device via Power over Ethernet (PoE). Thus, the backup power supply 130 can be configured to include an Ethernet port for supplying power to the communication device 110 over an Ethernet connection.

According to at least one embodiment, the backup power supply 130 can be configured to provide power to one or more devices in the event of a power interruption from the power grid 180. Thus, the backup power supply 130 can include a battery unit 132 suitable for providing power for a predetermined length of time. According to an embodiment, the backup power supply 130 can be configured as a UPS unit which includes a controller 134 for detecting a power interruption and/or failure occurring at the power outlet 140. The controller 134 then instantaneously switches to the battery unit 132 in order to prevent shutdown of any devices connected to the backup power supply 130.

According to one or more embodiments, a power monitoring unit 150 is provided for monitoring the presence and/or availability of power at the power outlet 140. The power monitoring unit 150 can be configured, for example, for connection to the power outlet 140 (or other appropriate power source) for detecting when power has been interrupted, as well as when power has been restored. According to further embodiments, the power monitoring unit 150 can be connected to the backup power supply 130. For example, the power monitoring unit 150 can be connected to outlets on the backup power supply that are not designated to operate on battery power during power outages and/or interruptions. When a power interruption occurs, such outlets would behave identically to the power outlet 140. Thus, the power monitoring unit 150 would still be capable of monitoring the presence and/or availability of power at the power outlet. According to still further embodiments, the power monitoring unit 150 can be configured to monitor operation of the backup power supply 130 to detect the switchover to battery power. The switchover can be used as an indication that a power interruption has occurred.

Upon detecting a power outage and/or interruption, power monitoring unit 150 is configured to provide a first signal to the communication device 110. According to at least one embodiment, the power monitoring unit 150 can include a cable 152, or other appropriate physical medium, to establish a connection with the communication device 110 and transmit the first signal. According to further embodiments, the power monitoring unit 150 can include a wireless transceiver 154 which facilitates transmission of the first signal to the communication device 110 wirelessly. In such arrangements, the communication device 110 can be configured to include a wireless transceiver 114 capable of communicating with the power monitoring unit 150. According to still further embodiments, the power monitoring unit 150 can include both a physical connection and a wireless connection to the communication device 110. The power monitoring unit 150 can also include a battery or capacitive storage device (not shown) which allows one or more transmissions of the first signal during the power outage.

The first signal is intended to alert the communication device 110 of the power outage and/or the switchover to battery power. As can be appreciated, the backup power supply 130 can instantaneously switch from conventional AC power supplied via the power outlet 140 to its internal battery 132 without interruption in the actual power being supplied to the communication device 110. Thus, when a power outage/interruption occurs, the communication device 110 is unaware that power is being drawn from the battery 135, and that only a limited supply of power is available. The communication device 110 would therefore continue functioning in normal operation mode, which can include various low priority (or non-essential) operations that can possibly require significant levels of power. For example, the communication device 110 can include circuitry for performing various communication functions including, but not limited to, routing, wired and wireless transmission, etc. Furthermore, various embodiments can allow the communication device 110 to supply power directly to the transmitter 190. Such operations can quickly deplete the amount of power stored in the battery 132.

According to at least one embodiment, upon receiving the first signal, the communication device 110 switches from a normal operation mode to a low power mode. The communication device 110 can be configured to offer limited functionality when operating in the low power mode. For example, one embodiment allows the communication device 110 to be configured for monitoring traffic data and blocking conventional HTTP requests that constitute recreational web browsing operations (e.g., social media, music/video streaming, etc). According to other embodiments, the communication device 110 can be configured to provide only emergency internet services, such as access to police departments, fire departments, hospitals, etc. According to still further embodiments, the communication device 110 can be configured to only facilitate Voice over Internet Protocol (VoIP) functions, while suspending all network functions and/or non-emergency internet functions. VoIP functions can be further restricted to contacting emergency services. Additionally, the communication device 110 can be configured to supply power to the transmitter 190 only while performing operations supported by the low power mode.

Once power has been restored from the power grid 180, the backup power supply 130 switches the supply of power from the battery 132 back to the power outlet 140. The battery 132 can also be recharged during this time. The power monitoring unit 150 also detects the presence of power at the power outlet 140 and supplies a second signal to the communication device 110. The second signal provides an indication to the communication device 110 that power has been restored. Upon receiving the second signal, the communication device 110 switches back to the normal operation mode.

Figure 2:
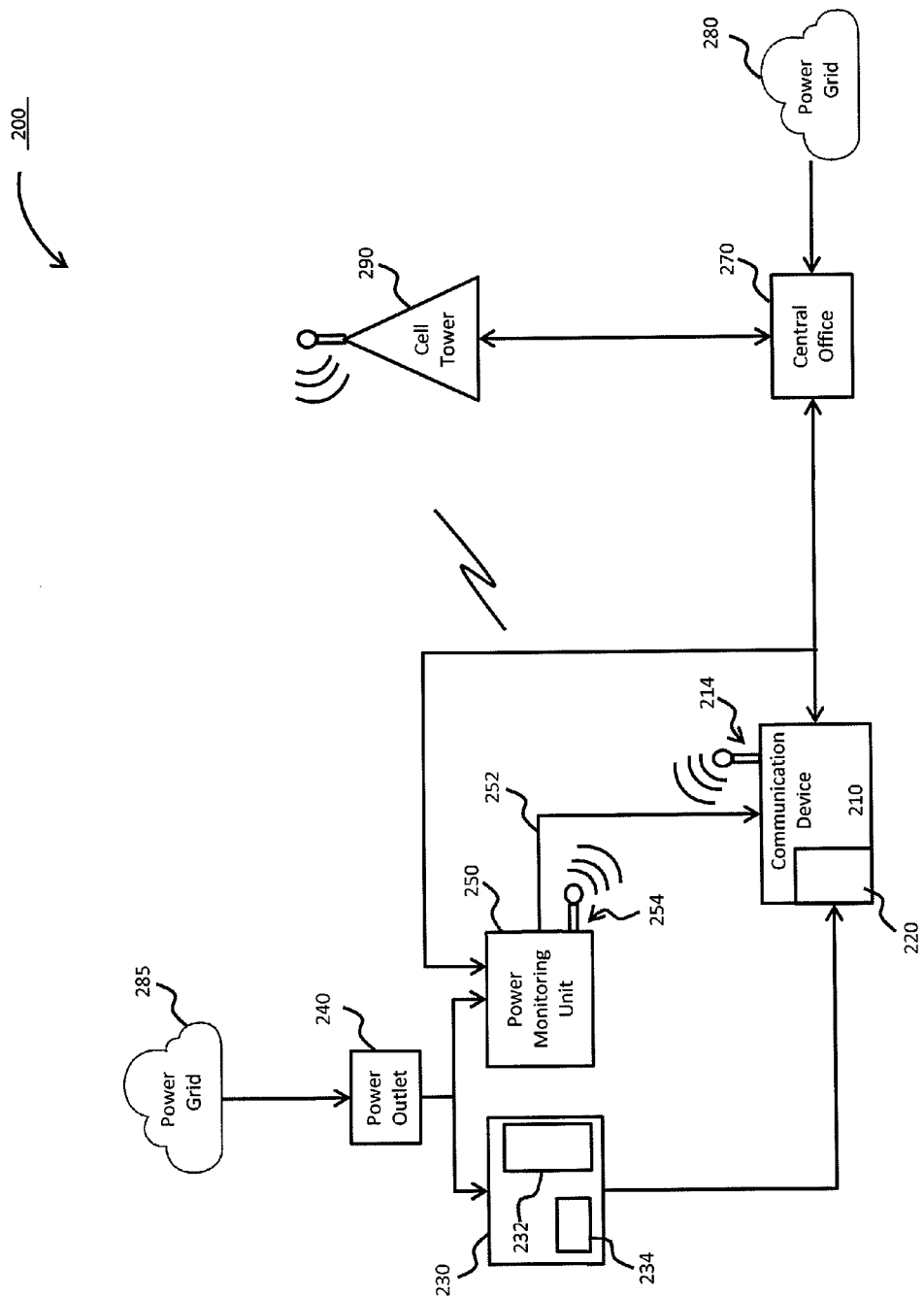
FIG. 2 is a diagram of a communication system incorporating a power monitoring system, according to another embodiment.

FIG. 2 illustrates a communication system 200 incorporating a power monitoring system, according to another embodiment. The communication system 200 includes a communication device 210 capable of establishing a circuit switched and/or packet switched connection to a central office 270 maintained by a service provider. For example, the central office can be maintained by a telephone service provider, internet service provider, cable provider, etc. The central office 270 includes various components (not shown) necessary for establishing communication with a plurality of customers. According to at least one embodiment, the central office 270 can be capable of providing mobile voice and data services, and includes multiple cell towers 290 (only one shown) for transmitting signals containing voice and data to customer devices (e.g., mobile phones, tablets, computers, etc.). As further illustrated in FIG. 2, the central office 270 receives power from an external source such as a power grid 280.

According to various embodiments, the communication device can be configured as a broadband modem, cable mode, DSL modem, etc. The communication device 210 includes a power supply unit 220 which can be integrated within the communication device 210, or configured as a separate component that can be detachably connected thereto. According to the embodiment illustrated in FIG. 2, a backup power supply 230 can be used to provide power to the communication device 210 via the power supply 220. The backup power supply 230 is further connected to a conventional power outlet 240 which receives power from a local/regional power grid 285. According to at least one embodiment, the communication device 210 can also receive power from the central office 270 in addition to, or separate from, the power supply 220.

Depending on the specific embodiment, the communication device 210 may be located close to the central office 270, and both may share the same power grid. A power outage at the location of the communication device 210, therefore, is indicative of a power outage at the central office 270. If the communication device 210 is located far from the central office 270, however, they may use different power grids (i.e., 280 and 285). In such conditions, a power outage at the location of the communication device 210 is not necessarily indicative of the same situation at the location of the central office 270.

According to at least one embodiment, the backup power supply 230 can include a battery unit 232 suitable for providing power for a predetermined length of time. The backup power supply 230 can also include a controller 234 to detect a power interruption and/or failure occurring at the power outlet 240. The controller 234 then instantaneously switches to the battery unit 232 in order to prevent shutdown of any devices connected backup power supply 230.

According to one or more embodiments, a power monitoring unit 250 is provided for monitoring the presence and/or availability of power at the power outlet 240. The power monitoring unit 250 can be configured, for example, for connection to the power outlet 240 for detecting when power has been interrupted, as well as when power has been restored. According to further embodiments, the power monitoring unit 250 can be appropriately connected to the backup power supply 230 in order to detect power outages and/or interruptions. According to the embodiment illustrated in FIG. 2, the power monitoring unit 250 can be further configured to monitor power being supplied to the communication device 210 from the central office 270. Such a feature allows the power monitoring unit 250 to determine when a power outage has occurred at the central office 270. According to at least one embodiment, the power monitoring unit 250 and/or the communication device 210 can be configured to receive a power status signal from the central office 270 via the cell tower 290. The power status signal can be used to indicate whether a power outage has occurred at the central office 270.

Upon detecting a power outage and/or interruption, power monitoring unit 250 is configured to provide a first signal to the communication device 210. According to various embodiments, the power monitoring unit 250 can be configured to supply the first signal wired 252 and/or wirelessly 254 to the communication device 210. The power monitoring unit 250 can also include a battery (not shown), or appropriate power storage device, sufficient to facilitate multiple signal transmissions during the power outage. The first signal is intended to alert the communication device 210 of the power outage as well as the switchover to battery power. As previously discussed, the communication device 210 is unaware when a power outage/interruption occurs and power is being drawn from the battery 232. The communication device 210 would therefore continue functioning in normal operation mode, which can include various low priority and/or non-essential operations that require significant levels of power. For example, the communication device 210 can include circuitry for performing various communication functions (e.g., routing, wired and wireless transmission, etc.) which can quickly deplete the amount of power stored in the battery 232.

Upon receiving the first signal, the communication device 210 switches from a normal operation mode to a low power mode. The communication device 210 can be configured to offer limited functionality when operating in the low power mode. As previously discussed, various embodiments allow the communication device 210 to provide only services associated with predetermined website access, emergency service access, VoIP, etc. The communication device 210 would, therefore, discontinue all other network functions and/or non-emergency internet functions (e.g., web browsing, music/video services, social media, etc.). Once power has been restored from the power grid 285, the backup power supply 230 switches the supply of power from the battery 232 back to the power outlet 240. The power monitoring unit 250 also detects the presence of power at the power outlet 240 and supplies a second signal, indicative of power restoration, to the communication device 210. Upon receiving the second signal, the communication device 210 switches back to the normal operation mode.

According to various embodiments, the central office 270 can cause transmission of a power status signal to the power monitoring unit 250 and/or the communication device 210 if a power outage occurs. Upon receiving the power status signal, for example, the power monitoring unit 250 supplies a third signal to the communication device 210 to indicate that a power outage has occurred at the central office 270. Upon receiving the third signal, the communication device 210 can also switch to the low power mode. As can be appreciated, a power outage at the central office 270 can nullify most activities of the communication device 210, as the central office 270 may also function as the gateway for connecting to external networks. More particularly, information transmitted from the communication device 210 will not be received by the central office 270. In such circumstances, the communication device 210 may discontinue all transmissions to the central office 270.

According to at least one embodiment, the communication device 210 can request acknowledgment of certain transmissions by the central office 270. For example, the communication device 210 can periodically request an acknowledgment packet when sending streams of packet data. If no acknowledgment packet is received, the communication device 210 can discontinue further transmissions in order to conserve power. When power is restored at the central office 270, another power status signal is transmitted to update the current power status. Responsive to the power status signal, the power monitoring unit 250 supplies the second signal to the communication device 210 in order to indicate power restoration and resume the normal operation mode.

Figure 3:
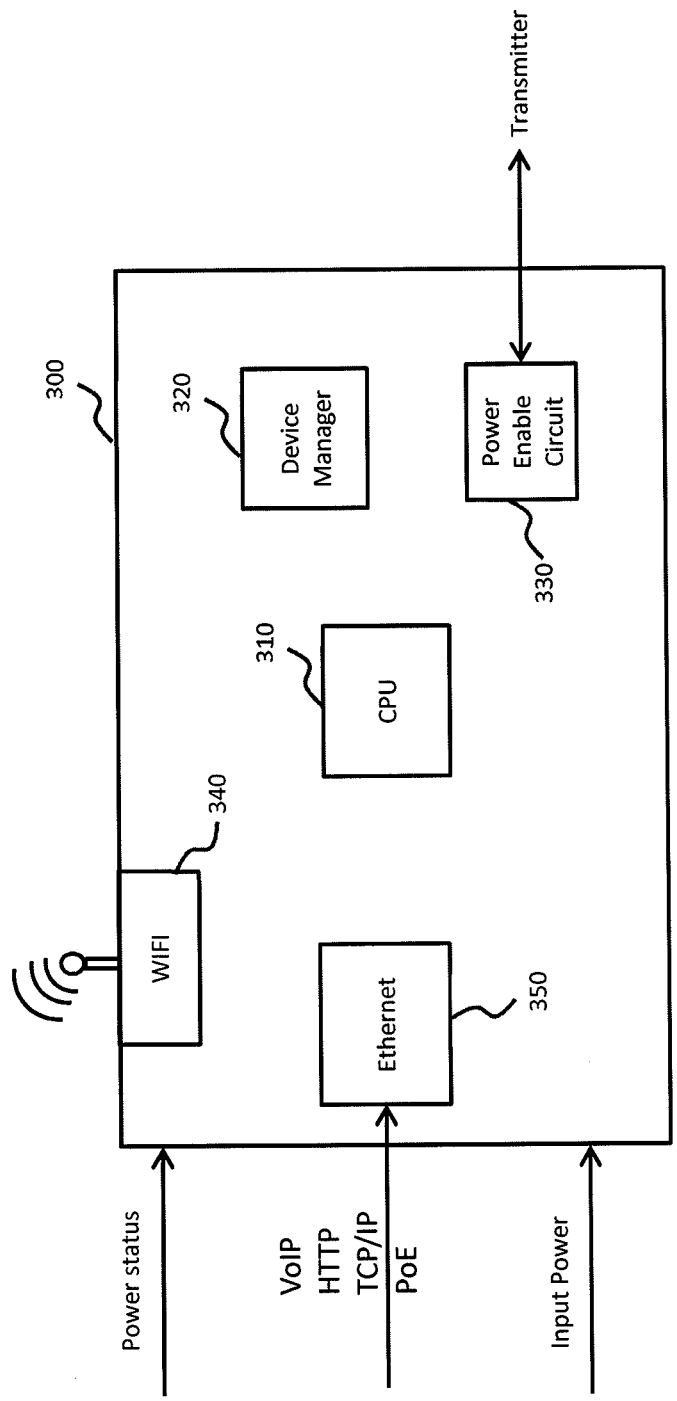
FIG. 3 is a block diagram illustrating various components of a communication device capable of operating in low power mode, according to one or more embodiments.

FIG. 3 is a block diagram illustrating various components of a communication device 300 capable of operating in low power mode, according to one or more embodiments. The communication device 300 includes, in part, a central processing unit (CPU) 310, a device manager 320, and a power enable circuit. The CPU 310 is configured to manage various operations of the communication device 300 as well specific components such as the device manager 320 and power enable circuit 330. Although FIG. 3 illustrates a single CPU 310, it should be noted that various embodiments can incorporate multiple CPUs. Furthermore, the communication device 300 can incorporate different controllers, field programmable gate arrays (FPGA), application specific integrated circuit (ASIC), reduced instruction set computing (RISC) processors, advanced RISC machines (ARM), etc., configured to implement specific functions that would otherwise be performed by the CPU 310.

The device manager 320 is configured to monitor and supply power to various internal components of the communication device 300. For example, the device manager 320 can reduce processor clock speed, turn off logic inside an ASIC, and/or reduce the power supplied to the internal components such as cooling fans, lights, etc., if a determination is made to switch from the normal operation mode to the low power mode. The power enable circuit 330 controls power supplied to the transmitter for transmitting/receiving signals to/from the satellite. According to at least one embodiment, the power enable circuit 330 can supply power to the transmitter only during predetermined operations (VoIP, emergency service access, etc.) when the communication device 300 is in the low power mode. According to other embodiments, the power enable circuit 300 can further supply a reduced amount of power to the transmitter to facilitate functions, such as receive, which require less power than transmit functions. Accordingly, the communication device would still be capable of receiving incoming signals required for functions such as incoming calls on VoIP.

According to the embodiment illustrated in FIG. 3, the communication device 300 includes a wireless communication interface such as a Wi-Fi adapter 340 and a LAN interface such as an Ethernet adapter 350 to facilitate communication with external devices and/or supply power to the communication device 300 via PoE. Depending on the specific implementation, the communication device 300 can be configured to process and route network data between the satellite and various network enabled devices such as computers, laptops, tablets, mobile phones, VoIP phones, etc. The communication device 300 utilizes the Wi-Fi adapter 340 to transmit/receive information to/from devices enabled for wireless communication. The communication device 300 can further be configured to utilize various protocols such as IEEE 802.11a, b, g, n, ac, etc. for wireless communication. The Ethernet adapter 350 facilitates physical (or cable) connections with external devices such as computers, printers, VoIP phones, etc. Additionally, the Ethernet adapter 350 can provide a connection to one or more external routers and/or switches, each of which can contain multiple Ethernet ports and/or Wi-Fi capabilities. Thus, additional devices can be configured to share the communication link established by the communication device.

According to at least one embodiment, the communication device 300 receives one or more signals from a power monitoring unit (see FIGS. 1 and 2) to indicate various conditions associated with an external power source such as the local power grid and/or central office. The Wi-Fi adapter 340 can be used to facilitate a wireless connection over which the power monitoring unit can transmit the one or more signals. According to further embodiments, the Ethernet adapter 350 can facilitate a wired connection over which the power monitoring unit can transmit the one or more signals. According to still further embodiments, other types of wired connections/interfaces (e.g., Universal Serial Bus) can be used to transmit the one or more signals to the communication device 300.

Figure 4:
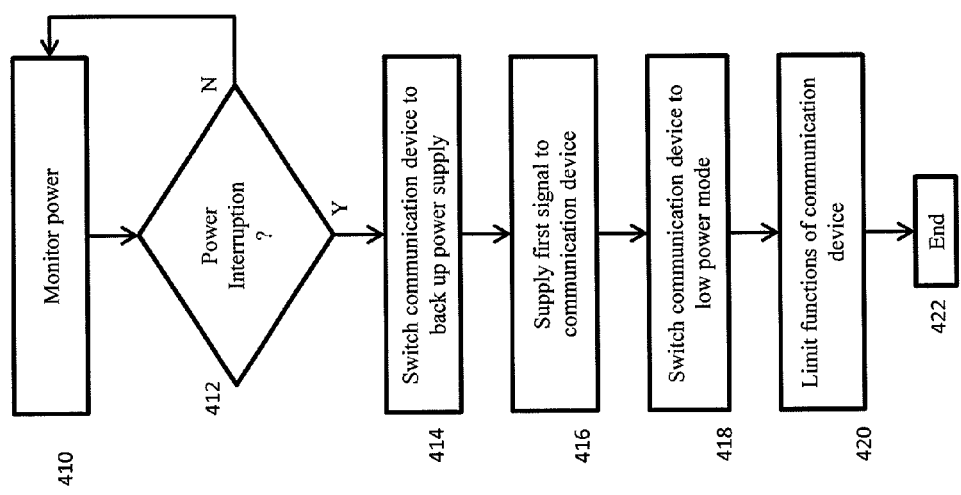
FIG. 4 is a flowchart of a process for monitoring power to a communication device and switching operation modes, according to at least one embodiment.

FIG. 4 is a flowchart illustrating the steps performed for monitoring power to a communication device and switching operation modes, in accordance with at least one embodiment. At 410, power being supplied to the communication device is monitored. According to various embodiments, a power monitoring unit can be provided to monitor the availability of power at the power outlet and/or the backup power supply. At 412, the power monitoring device determines whether a power interruption has occurred. This can be done, for example, by detecting the absence of power at the power outlet and/or detecting battery activation by the backup power supply. According to various embodiments, the power supply can be monitored periodically or at predetermined time intervals. If a power interruption is not determined, control returns to 410.

If a power interruption is determined, the communication device is switched to the backup power supply at 414. At 416, a first signal is supplied to the communication device upon detection of the power interruption. The first signal is indicative of the power interruption and/or activation of the backup power supply. Upon receipt of the first signal, the communication device is switched, at 418, from a normal operation mode to a low power mode. At 420, the communication device limits one or more of its operating functions. For example, the communication device can limit operations to network functions related to emergency services, VoIP, etc. Additionally, the device manager can reduce processor clock speed, turn off logic inside an ASIC, and/or adjust power supplied to various components of the communication device, such as cooling fans, lights, servo motors, etc. The process subsequently ends at 420.

Figure 5:
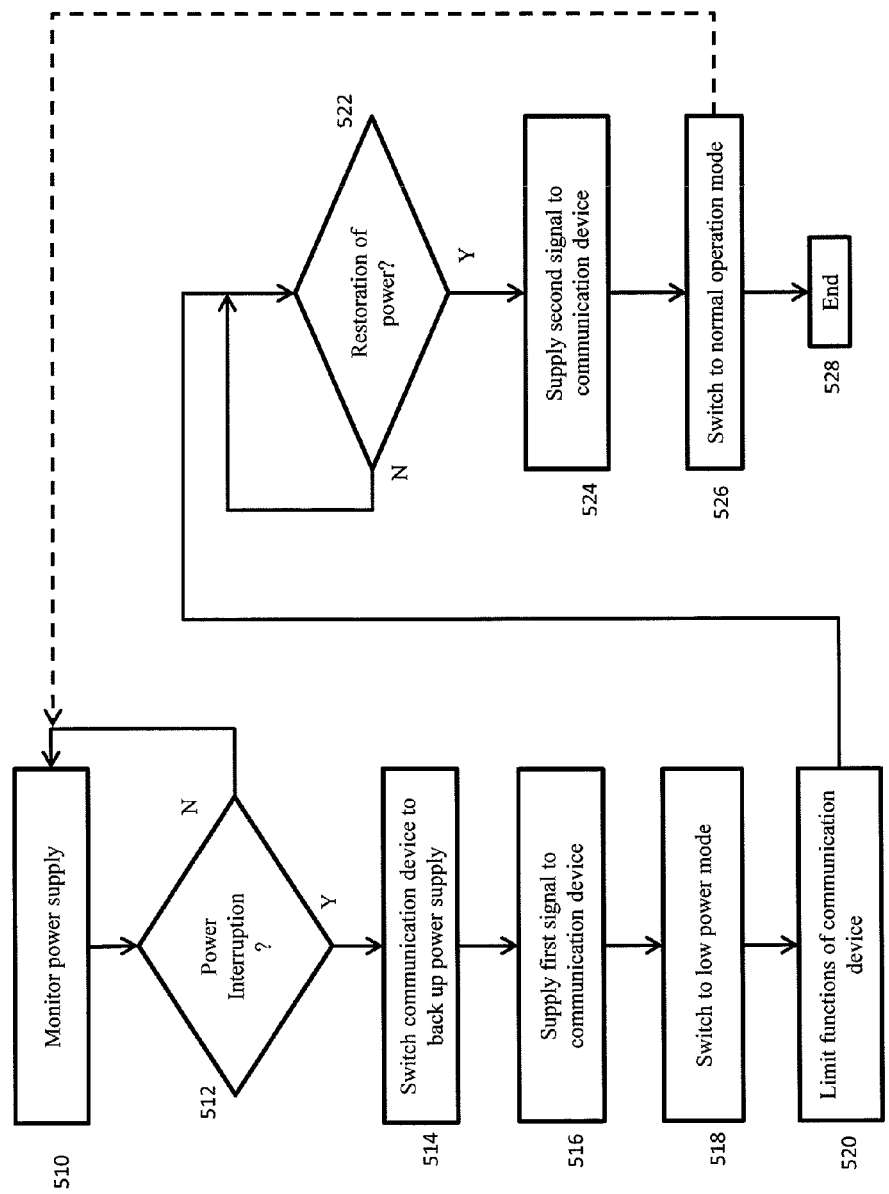
FIG. 5 is a flowchart of a process for monitoring power to a communication device and switching operation modes, according to another embodiment.

FIG. 5 is a flowchart illustrating the steps for monitoring power to a communication device and switching operation modes, in accordance with one or more embodiments. At 510, power being supplied to the communication device is monitored, for example, by a power monitoring device. At 512, the power monitoring device determines whether a power interruption has occurred. If it is determined that no power interruption has occurred, then control returns to 510 where the power monitor continues to monitor the power supply. At 514, if a power interruption is determined, the communication device is switched to a backup power supply.

At 516, a first signal, indicative of the power interruption and/or activation of the backup power supply, is supplied to the communication device. At 518, upon receipt of the first signal, the communication device is switched from a normal operation mode to a low power mode. At 520, the communication device limits one or more of its operating functions. As previously discussed, operating functions can be restricted and/or limited to predetermined website access, emergency service access, VoIP, etc. At 522, it is determined whether power has been restored. If power has not been restored, then the system is continually monitored in order to determine when power is restored. This is indicated by the line returning control to 522. If it is determined that power has been restored, however, control passes to 524.

At 524, a second signal is supplied to the communication device. As previously discussed, the second signal provides an indication of power restoration and/or deactivation of the backup power supply. At 526, the communication device switches from the low power mode to normal operation mode. More particularly, the communication device resumes all normal functions that were limited and/or restricted while operating in the low power mode. The process subsequently ends at 528. As can be appreciated, multiple power outages can occur either in a short time span or an extended period of time. The system must, therefore, be continually monitored for possible power interruptions. Such a feature is illustrated with the broken line returning control to 510, where the power being supplied from, for example, the power grid is monitored to detect any possible power interruptions.

While certain exemplary embodiments and implementations have been described herein, other embodiments and modifications will be apparent from this description. Accordingly, the various embodiments described are not intended to be limiting, but rather are encompassed by the broader scope of the presented claims and various obvious modifications and equivalent arrangements.

What is claimed is:

1. A method comprising:
   detecting a power interruption to a satellite modem of a satellite communication network using a power monitoring unit;
   switching to a backup power supply for maintaining continuous operation of the satellite modem;
   supplying a first signal from the power monitoring unit to the satellite modem upon detection of the power interruption, the first signal being indicative of the power interruption and/or activation of the backup power supply;
   switching, by the satellite modem, from a normal operation mode to a low power mode;
   limiting functions of the satellite modem while in the low power mode to supplying power to an outdoor transmitter and transmit/receive functions related to emergency services; and
   returning to normal operation when power has been restored.

2. The method of claim 1, wherein returning to normal operation further comprises:
   detecting restoration of power; and
   supplying a second signal, to the satellite modem, indicating power restoration and/or deactivation of the backup power supply.

3. The method of claim 2, further comprising switching the satellite modem from the low power mode to the normal operation mode in response to the second signal.

4. The method of claim 2, wherein the first signal and the second signal are wirelessly supplied to the satellite modem.

5. The method of claim 1, wherein:
   a third signal indicative of power loss at a central office is received by the satellite modem; and
   the one or more functions include all transmit/receive functions.

6. An apparatus comprising:
   a satellite modem of a satellite communication network configured to receive at least one signal from a power monitoring unit, said satellite modem including one or more processors configured to:
   determine if a first signal, received from the power monitoring unit, is indicative of a power interruption and/or activation of a backup power supply;
   switch operation of the satellite modem from a normal operation mode to a low power mode;
   limit functions of the satellite modem while in the low power mode to supplying power to an outdoor transmitter and transmit/receive functions related to emergency services; and
   returning to normal operation when power has been restored.

7. The apparatus of claim 6, wherein a second signal is received by the satellite modem, and the one or more processors are further configured to:
   determine if the second signal is indicative of power restoration and/or deactivation of the backup power supply; and
   switch operation of the satellite modem from the low power mode to the normal operation mode.

8. The apparatus of claim 7, wherein the satellite modem is configured to receive the first signal and the second signal wirelessly.

9. The apparatus of claim 6, wherein:
the satellite modem is configured to receive a third signal indicative of power interruption at a central office; and
the one or more functions include all transmit/receive functions.

10. A system comprising:
a satellite modem of a satellite communication network including one or more processors;
a backup power supply for automatically supplying power to the satellite modem during a power interruption; and
a power monitoring unit for detecting the power interruption and supplying a first signal to the satellite modem, the first signal being indicative of at least one of the power interruption and the backup power supply being activated,
wherein the one or more processors are configured to:
determine if the first signal, received by the satellite modem, is indicative of a power interruption and/or activation of a backup power supply,
switch operation of the satellite modem from a normal operation mode to a low power mode,
limit functions of the satellite modem while in the low power mode to supplying power to an outdoor transmitter and transmit/receive functions related to emergency services, and
return to normal operation when power has been restored.

11. The system of claim 10, wherein the power monitoring unit is configured to supply a second signal to the satellite modem, and the one or more processors are further configured to:
determine if the second signal is indicative of power restoration and/or deactivation of the backup power supply; and
switch operation of the satellite modem from the low power mode to the normal operation mode.

12. The system of claim 11, wherein the satellite modem is configured to receive the first signal and the second signal wirelessly.

13. The system of claim 11, wherein a cable is provided for connecting the power monitoring unit to the satellite modem, and the first signal and second signal are supplied via the cable.

14. The system of claim 10, wherein:
the satellite modem is configured to receive a third signal indicative of power outage at a central office; and
the one or more functions include all transmit/receive functions.

* * * * *